Figure 1:
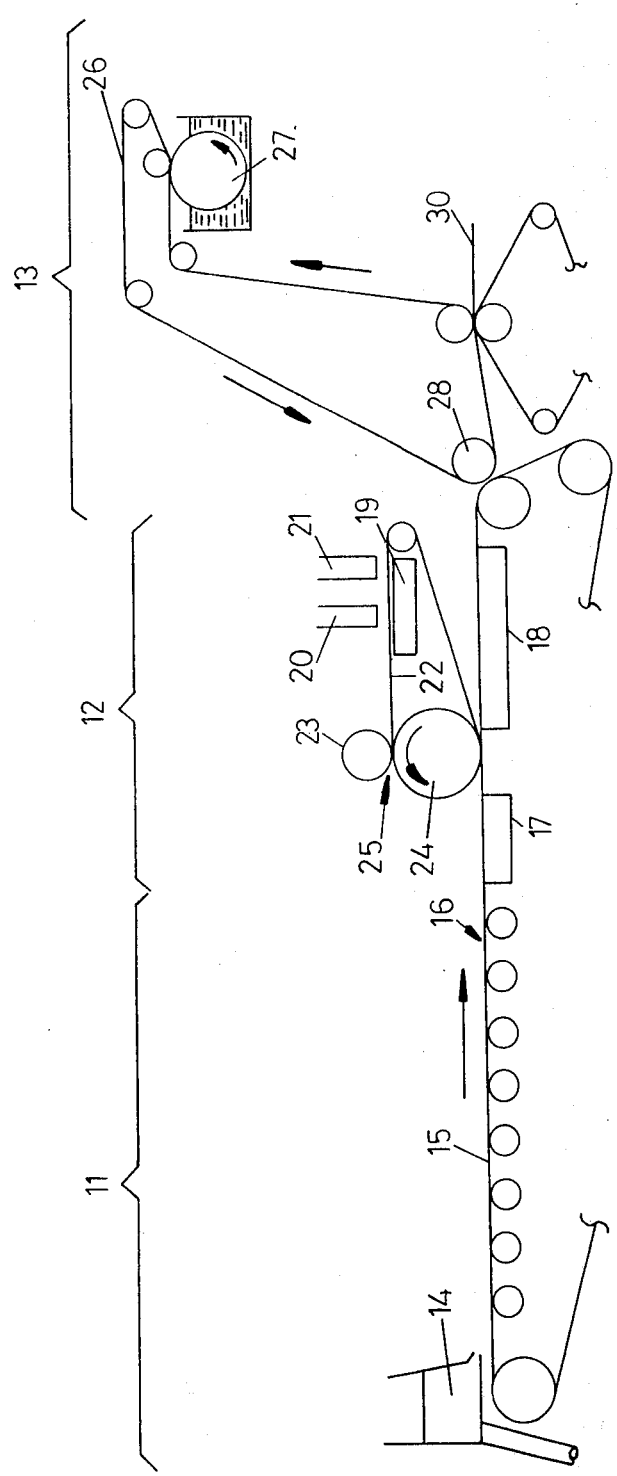

United States Patent [19]

Curry et al.

[11] 3,954,554

[45] May 4, 1976

[54] MULTI-PLY PAPER AND PAPERBOARD HAVING A WET-LAID PLY AND A DRY-LAID PLY

[75] Inventors: Harold George Curry, Hambrook; Brian William Attwood, Hanham; Derek Graham Walter White, Bristol, all of England

[73] Assignee: Karl Kroyer St. Anne's Limited, Bristol, England

[22] Filed: Aug. 21, 1973

[21] Appl. No.: 390,218

[30] Foreign Application Priority Data

Sept. 9, 1972 United Kingdom............... 41958/72

[52] U.S. Cl................................ 162/104; 162/132; 162/201; 162/303; 162/381; 264/121
[51] Int. Cl.²...................... D21H 1/02; D21H 1/06
[58] Field of Search........... 162/132, 304, 104, 210, 162/381, 133, 123, 125, 129, 303, 102, 157, 206, 145; 264/81, 91, 121, 113, 120

[56] References Cited

UNITED STATES PATENTS

| 1,538,788 | 5/1925 | Fish................................ 162/133 X |
| 2,698,271 | 12/1954 | Clark.............................. 264/121 X |
| 2,751,962 | 6/1956 | Drummond.................... 264/121 X |
| 2,881,072 | 4/1959 | Clark.................................. 162/104 |
| 2,913,365 | 11/1959 | Osborne et al..................... 162/201 |
| 2,961,361 | 11/1960 | Dennis.............................. 264/121 |

*Primary Examiner*—S. Leon Bashore
*Assistant Examiner*—Richard V. Fisher
*Attorney, Agent, or Firm*—Larson, Taylor and Hinds

[57] ABSTRACT

A method and apparatus for making a multi-ply paper sheet wherein a first web is formed by wet-laying fibres and a second web is formed by dry-laying fibres, the two webs being combined to form a multi-ply sheet and wherein the dry-laid web is produced by depositing dry fibres on a supporting band and consolidating the web by hot moist pressing before transferring to the first wet-laid web.

10 Claims, 3 Drawing Figures

MULTI-PLY PAPER AND PAPERBOARD HAVING A WET-LAID PLY AND A DRY-LAID PLY

This invention concerns a process for making a multi-ply paper or paperboard product, apparatus for forming such a product and a multi-ply paper or paperboard made by the process or on the apparatus of the invention.

According to one aspect of the present invention there is provided a process for making a multi-ply paper or paperboard product comprising wet-laying fibres and forming a first web, dry-laying fibres and forming a second web, and combining the two formed webs to provide a multi-ply product.

The process preferably comprises wet-laying fibres and forming a third web and combining the formed third web with the first two formed webs to provide a multi-ply product.

The webs may be laminated together without the use of additional adhesive, the moisture in the wet-laid webs and/or the binder used in the dry-laid web being sufficient to laminate the webs together.

Preferably the or each wet-laid web is produced on a Fourdrinier or cylinder mould machine or other forming devices.

In a preferred embodiment the dry-laid web is produced by depositing dry fibres on a supporting band, consolidating the web and transferring to the first wet-laid web.

The dry fibres may be mixed with dry powdered binder, the dry mixture being sprayed with water and at least partly consolidated to form the dry-laid web. Alternatively the fibrous layer may be sprayed with a binder. Yet again the fibres may be impregnated with a binder, dried, dry-laid and subsequently sprayed with water.

According to another aspect of the present invention there is provided apparatus for forming a multi-ply product as set forth above comprising means for wet-laying fibres and forming a first web, means for dry-laying fibres and forming a second web and means for combining the two formed webs to provide a multi-ply product.

The apparatus preferably comprises means for wet-laying fibres and forming a third web and combining the formed third web with the first two formed webs to provide a multi-ply product.

According to yet another aspect of the present invention a paper or paperboard product formed by the process set forth above or on the apparatus set forth above comprises at least one wet-laid ply and at least one dry-laid ply laminated together to form a multi-ply product.

Figure 2:
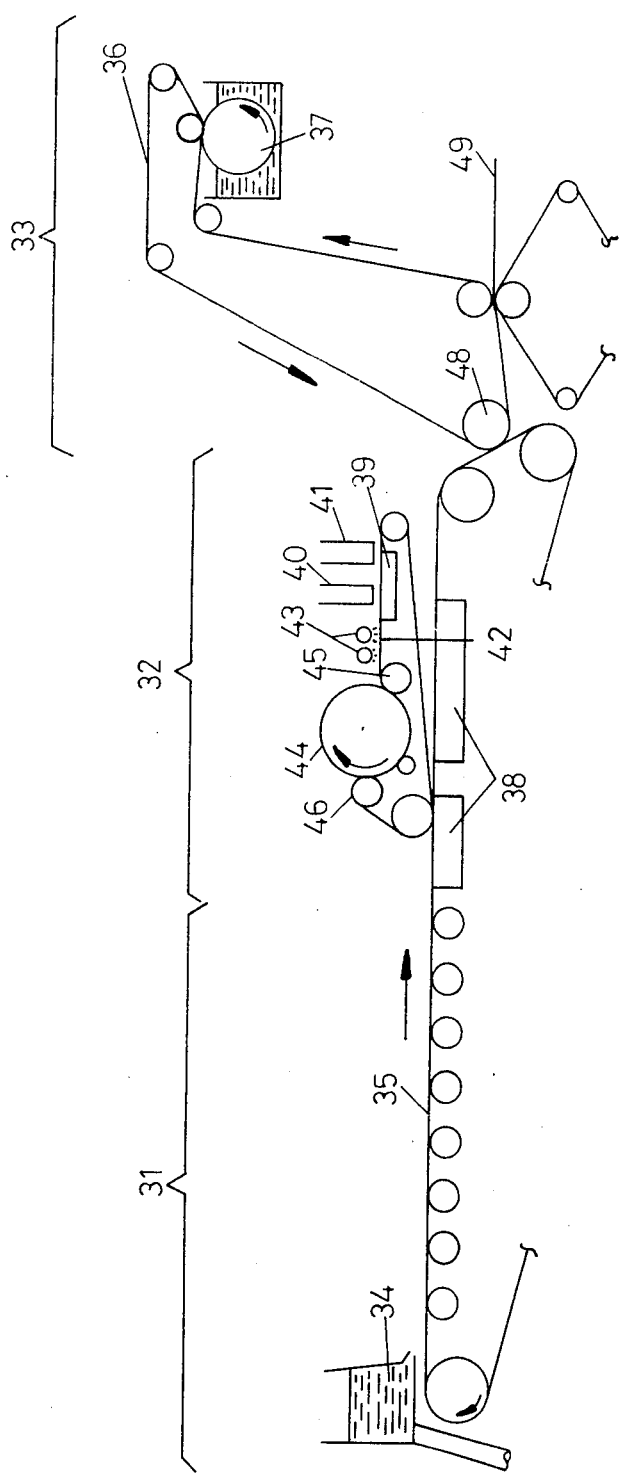
Figure 3:
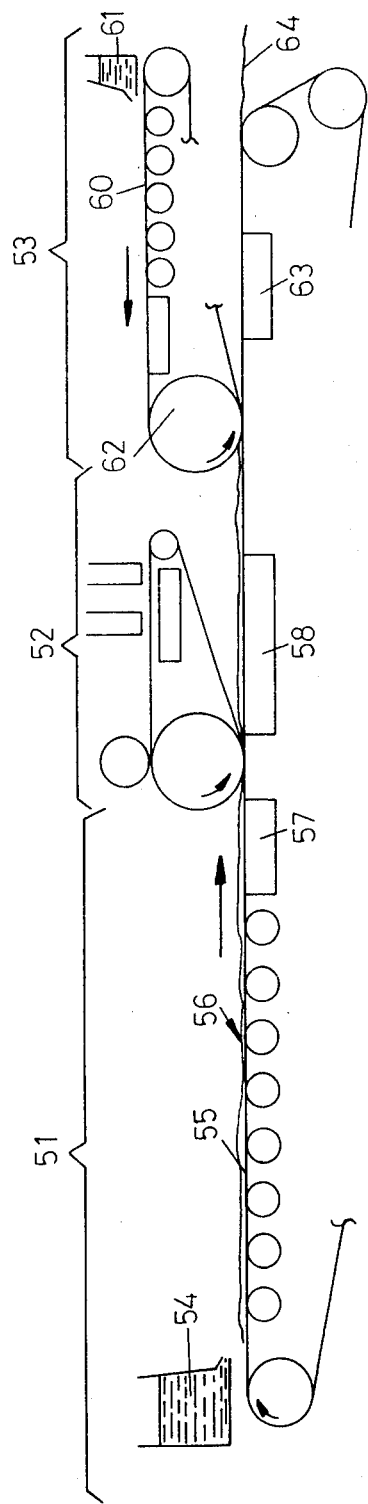

The invention is illustrated merely by way of example in the accompanying drawings in which FIGS. 1, 2 and 3 are diagrammatic illustrations of three alternative arrangements of apparatus according to the present invention.

Referring to FIG. 1, the apparatus comprises three pieces of basic equipment namely a Fourdrinier forming wet end 11 a device 12 for laying a web of dry fibres and a cylinder mould machine 13.

The Fourdrinier wet end 11 and cylinder mould 13 are both adapted to form webs of wet laid fibre in conventional manner. Stock from the head-box 14 of the Fourdrinier wet end 11 deposits fibres onto the forming wire 15 to form a wet-laid web 16 by dewatering through the wire.

Dry fibres mixed with dry powdered adhesive or binder are deposited in an air stream through two heads 20 and 21 onto a foraminous forming wire 22 in the device 12. A vacuum box 19 assists in drawing the fibres onto the wire 22. The web of dry fibres so formed is consolidated by a press roll 23 defining with a heated cylinder 24 a pressure nip 25. The formed and consolidated web is transferred from wire 22 onto the upper surface of the wet-laid web 16 by suction boxes 17 and 18 to produce a two-ply web.

In the cylinder mould machine 13 stock is deposited onto the forming wire 26 by cylinder 27. The formed web on wire 26 is deposited onto the upper surface of the two-ply product leaving wire 15 at roll 28 to form a three-ply product 30 which passes onto the drying and surface finishing sections of the machine (not shown).

With the apparatus of FIG. 1 there is provided a means for producing a three-ply product having wet-laid, dry-laid and wet-laid plies. It will be appreciated that further plies can be added by the wet or dry process as required.

Referring now to FIG. 2 the apparatus illustrated is similar to that of FIG. 1 and comprises a Fourdrinier wet end 31 a device 32 for providing a dry-laid web and a cylinder mould 33. The Fourdrinier 31 and cylinder mould 33 are adapted to provide wet-laid webs and the device 32 is adapted to provide a dry-laid web of fibre.

The apparatus of FIG. 2 differs from that of FIG. 1 in that the device 32 forming the dry-laid web provides further consolidation of the web before it is laminated to the wet-laid ply coming from the Fourdrinier section 31. In the device 32 the dry-laid fibres mixed with adhesive are deposited by heads 40 and 41 onto the wire 42 and the mixture is sprayed with water from heads 43. The moist mixture is then passed around a heated cylinder 44 through at least two pressure nips provided by pressure rolls 45 and 46 whereby the mixture is subjected to hot moist pressing to consolidate the strong web of fibre. Some four or five pressure nips one or more of which may be heated can be provided around the cylinder 44 and by so selecting the pressure at the nips and the temperature of the surface of the cylinder considerable strength can be produced in the web as described in commonly-owned co-pending application U.S. patent application Ser. No. 375,094, filed June 29, 1973.

The wet laid web formed on wire 35 by stock from head box 34 passes across suction boxes 38 which assist in transferring to the upper surface of the wet laid web, the dry-laid web from wire 42.

A further wet laid web formed on wire 36 from cylinder 37 is transferred onto the upper surface of the two ply web on wire 35 at roll 48. The three ply product 49 so formed passes onto coating and finishing sections (not shown).

Referring now to FIG. 3 this illustrates an apparatus very similar to that of FIG. 1 and comprises a Fourdrinier wet end 51 a device 52 for forming a dry-laid web and a further Fourdrinier section 53 for forming a second wet-laid web. The section 53 replaces the cylinder mould devices 13 and 33 of previous embodiments.

A wet-laid web 56 is deposited from head box 54 onto the forming wire 55 which in this case is common to all sections. A dry-laid web is formed in the device 52 in the manner described with reference to FIG. 1 and deposited on top of the wet-laid ply 56 from Fourdrinier section 51 assisted by vacuum boxes 57, 58. A further wet-laid web is deposited onto a forming wire 50 from a head-box 61 and this wet-laid web when formed by drainage through the wire 60 is deposited on top of the two plies from sections 51 and 52 at roll 62 assisted by vacuum box 63 to form a three-ply product 64 which is transferred to the drying and surface finishing sections of the machine (not shown).

Although three embodiments have been described above it will be appreciated that many variations are available without departing from the scope of the present invention for forming a multi-ply product having wet and dry-laid webs forming the plies. Thus in FIGS. 1 and 3 the devices 12 and 52 for forming the dry-laid web can be of the same type as device 32 of the FIG. 2 embodiment in which further consolidation of the dry-laid web is effected before being laminated to the wet-laid web. Similarly in the FIG. 2 embodiment the devices 12 and 52 of FIGS. 1 and 3 respectively could be used in place of the device 32.

In all embodiments the dry-forming section 12, 32, 52 could be based on one of the designs described and illustrated in commonly-owned copending U.S. Pat. application Ser. No. 375,094, filed June 29, 1973.

With all embodiments the adhesive or binder mixed with the dry fibres in the second ply is activated by the water present in the wet-laid plies to provide a bonding agent for laminating the three plies together. Furthermore there is sufficient moisture in the wet-laid plies to provide some hydrogen bonding between the fibres in the wet and dry plies in the finished product. However, compared with conventional wholly wet-laid sheets and wholly dry-laid sheets of material this combination machine forming wet and dry plies in a single product has considerable advantages since it enables a manufacturer to enjoy the characteristics conventionally provided by a wet-laid product whilst enjoying the additional benefits of the dry-laid web.

Without the attendant disadvantages of excessive water and further drying cylinders and tunnels, the dry-laid webs provided by devices 12, 32 and 52 in the embodiments of FIGS. 1–3 respectively could double the output of a given wet machine. For example a machine of the type shown in FIG. 1 and having only a Fourdrinier section 11 and cylinder mould section 13 producing a paperboard of 100g.s.m. can, without altering its speed, have its output doubled to provide a 200 g.s.m. product merely by adding a relatively small dry-laid section 12. No additional drying capacity is required and no additional plumbing and water catchment devices are necessary. Not only does such an addition substantially increase the output of conventional machines but it will be appreciated that, by suitably modifying the weight of the dry-laid web being added to the machine the output of the machine can be varied considerably. It is possible to alter the weight of web being deposited in the dry-laying device 12 with considerable ease compared with the facility available in conventional wet-laying sections 11 and 13. It is possible in practice to vary the output of a typical wet end machine from say 100 g.s.m. to 200 g.s.m. at any intervening step by relatively simple adjustment of the capacity of the dry-laying section 12.

The facility described above will considerably enhance the output of conventional wet machines in service around the world, extending their life and delaying the necessity for introducing new plant and equipment. The multi-ply product produced on apparatus according to the present invention has characteristics particularly attractive in the folding box board industry. Thus dry-laid products are generally characterised by high bulk, squareness i.e. non-directional properties in the plane of the sheet and good dimensional stability. These properties are used in combination with those of the wet-laid ply to enhance the characteristics of the final sheet.

What we claim is:

1. In a process for making a multi-ply paper sheet or board comprising the steps of, forming a first web by wet-laying fibres, forming a second dry-laid web at a location away from the first web by depositing dry fibres on a supporting band and applying adhesive or binder to the dry fibres, and subsequently transferring the dry-laid web onto the first wet-laid web, including utilizing moisture in the first wet-laid web to adhere the two webs together, the improvement wherein said step of forming the second dry-laid web includes passing the dry-laid web through a press nip formed between a press roll and a heated cylinder to consolidate the dry-laid web before it is transferred onto the first wet-laid web.

2. A process as claimed in claim 1, wherein the wet-laid web is produced on a Fourdrinier machine.

3. A process as claimed in claim 2, comprising wet-laying additional fibres to form a third web and combining the formed third web with the combined, first two formed webs to provide a multi-ply paper sheet or board.

4. A process as claimed in claim 3, wherein the third web is formed from fibres laid by a cylinder mould machine.

5. A process as claimed in claim 1 wherein the adhesive or binder is dry powder and including spraying water onto the dry-laid web during the consolidation.

6. In an apparatus for forming a multi-ply paper sheet or board comprising:
   means for wet-laying fibres to form a first web,
   means for dry-laying fibres to form a second web at a location away from the first web, and
   means for applying adhesive or binder to the dry fibres,
   the improvement comprising means including two rolls defining a press nip for consolidating the second web after the adhesive or binder has been applied thereto,
   heating means connected to one of said rolls for heating the second web as it passes through the nip, and,
   means for combining the first web with the consolidated second web to provide a multi-ply paper sheet or board.

7. Apparatus as claimed in claim 6, wherein the means for wet-laying fibres includes a Fourdrinier section for forming the first web.

8. Apparatus as claimed in claim 6, including a further device for wet-laying a third web, the device including a supporting band on which the third web is formed, and means for transferring the third web from the supporting band onto the upper surface of the combined first two webs upon said main forming band.

9. Apparatus as claimed in claim 6 further comprising means for applying water to the second web during consolidation.

10. Apparatus as claimed in claim 6, wherein the means for wet-laying fibres includes a main forming band on which the first web is formed, the dry-laid web forming means including a supporting band on which the second web is formed, and the combining means includes means for transferring the second web from the supporting band onto the upper surface of the first web supported on said main forming band.

* * * * *